(12) United States Patent
Yu et al.

(10) Patent No.: US 12,401,698 B2
(45) Date of Patent: Aug. 26, 2025

(54) METHOD AND APPARATUS FOR PROVIDING BI-DIRECTIONAL INTERACTION FOR PERFORMANCE IN METAVERSE SPACE

(71) Applicant: ELECTRONICS AND TELECOMMUNICATIONS RESEARCH INSTITUTE, Daejeon (KR)

(72) Inventors: Cho Rong Yu, Daejeon (KR); Youn Hee Gil, Daejeon (KR); Il Kwon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/521,784

(22) Filed: Nov. 28, 2023

(65) Prior Publication Data

US 2024/0251001 A1 Jul. 25, 2024

(30) Foreign Application Priority Data

Jan. 20, 2023 (KR) .................. 10-2023-0008468

(51) Int. Cl.
*H04L 65/1083* (2022.01)
*H04L 65/80* (2022.01)

(52) U.S. Cl.
CPC .......... *H04L 65/1083* (2013.01); *H04L 65/80* (2013.01)

(58) Field of Classification Search
CPC ........................... H04L 65/1083; H04L 65/80
See application file for complete search history.

(56) References Cited

U.S. PATENT DOCUMENTS

| 11,446,550 | B2 | 9/2022 | DeCarlo | |
|---|---|---|---|---|
| 2020/0359108 | A1 | 11/2020 | Lee | |
| 2022/0222882 | A1* | 7/2022 | Reilly | ............ G01P 13/00 |
| 2024/0056492 | A1* | 2/2024 | Burns | ............ H04N 7/157 |

FOREIGN PATENT DOCUMENTS

| KR | 10-2007-0092386 A | 9/2007 |
|---|---|---|
| KR | 10-2020-0110693 A | 9/2020 |
| KR | 10-2022-0069379 A | 5/2022 |
| KR | 10-2022-0126660 A | 9/2022 |

* cited by examiner

*Primary Examiner* — Suraj M Joshi (57) ABSTRACT

In an aspect of the present disclosure, a bidirectional interaction providing device is provided. The device includes a real-time performance unit that transmits real-time performance information through a real-time performance information session to each user terminal participating in a performance channel related to the real-time performance; an interactive reception unit that receives interaction feedback from a first user terminal through an interaction transmission session; and an interaction transmission unit that transmits the interaction feedback to a destination of the interaction feedback by referring to information on the destination.

18 Claims, 7 Drawing Sheets

METHOD AND APPARATUS FOR PROVIDING BI-DIRECTIONAL INTERACTION FOR PERFORMANCE IN METAVERSE SPACE

TECHNICAL FIELD

The present disclosure relates to a device and method for providing bidirectional interaction for a performance in a metaverse space.

BACKGROUND

The contents described below merely provide background information related to the present disclosure and do not constitute prior art.

In a non-face-to-face environment due to COVID-19, the metaverse that provides an immersive environment to solve the lack of realism, which is the limit of online, is receiving a lot of attention.

In addition to basic metaverse games such as Roblox and Minecraft, research and attempts to apply metaverse to various industries are being actively conducted.

Similarly, in the field of performance, the participation of big-name artists in virtual performance services, including virtual performance events by musicians using game platforms, is accelerating.

In abroad, a virtual concert platform that can hold live concerts featuring avatars is provided, and in Korea, a virtual concert that combines ultra-high-definition volumetric content with the Metaverse platform E-Friend has been held.

Currently, the Metaverse environment is limited to operating channels with a maximum of 100 users based on a single channel due to the limitations on the number of concurrently connected users in real time and the number of users who can interact with each other in real time. In order to provide a Metaverse virtual performance service with a large number of users, unlike the case where a small number of users participate, there is a need to overcome the limitations of the number of concurrent users in the existing Metaverse channel.

SUMMARY

In view of the above, the present disclosure provides a device and method for providing bidirectional interaction for a performance in a metaverse space.

In an aspect of the present disclosure, a bidirectional interaction providing device is provided. The device includes a real-time performance unit that transmits real-time performance information through a real-time performance information session to each user terminal participating in a performance channel related to the real-time performance; an interactive reception unit that receives interaction feedback from a first user terminal through an interaction transmission session; and an interaction transmission unit that transmits the interaction feedback to a destination of the interaction feedback by referring to information on the destination.

In another aspect of the present disclosure, a bidirectional interaction providing method is provided. The method includes a real-time performance step of transmitting real-time performance information through a real-time performance information session to each user terminal participating in a performance channel related to the real-time performance; an interaction receiving step of receiving interaction feedback from a first user terminal through an interaction transmission session; and an interaction transmission step of transmitting the interaction feedback to a destination of the interaction feedback by referring to information on the destination.

According to the present disclosure, bidirectional interactions can be provided between performers and users participating in metaverse performances, and various bidirectional interactions can be provided between performance participants, such as between performers and user groups, between users and users, and between user groups and user groups.

DETAILED DESCRIPTION

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered obscuring the subject of the present disclosure will be omitted for the purpose of clarity and for brevity.

Figure 1:
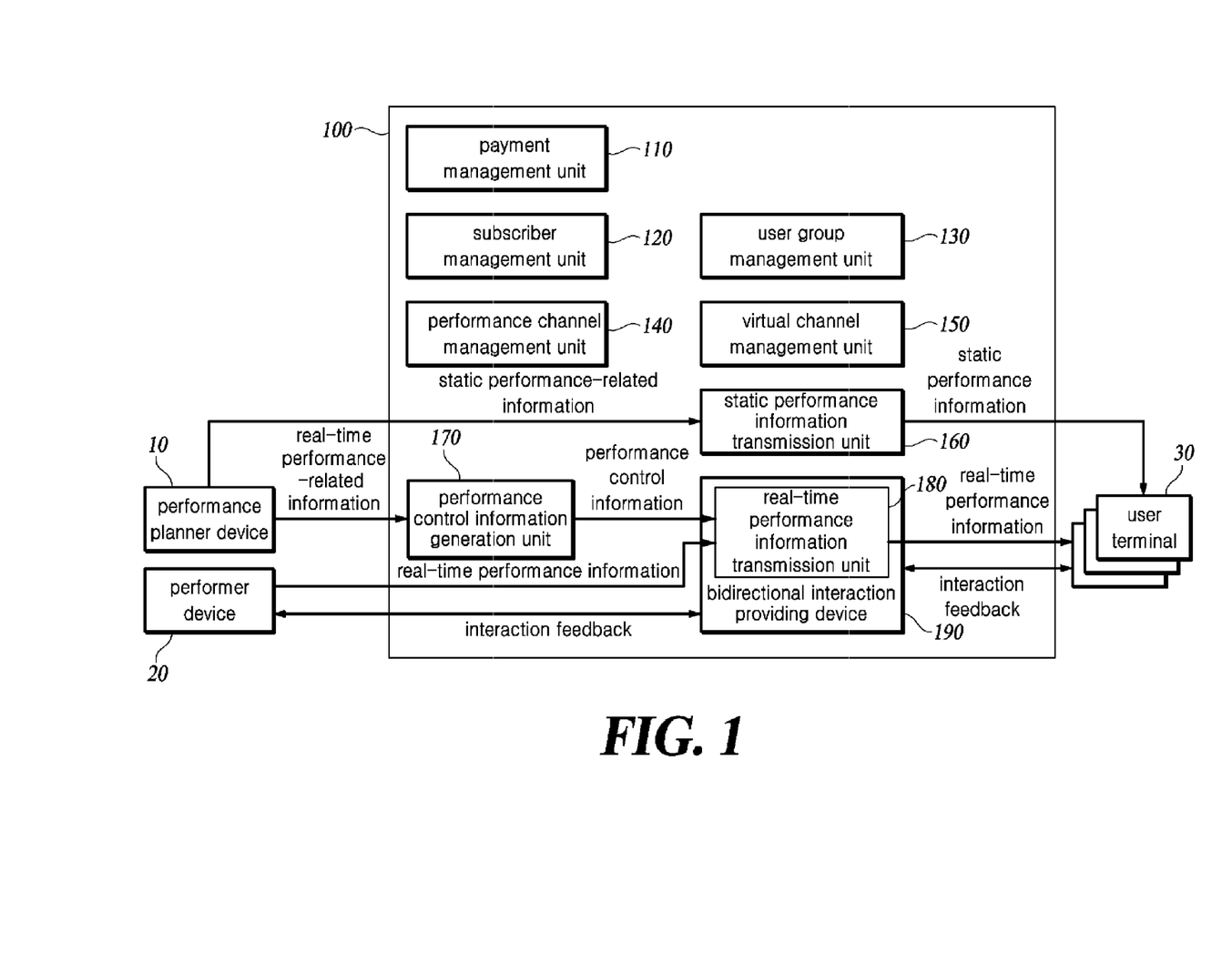
FIG. 1 is an exemplary functional block diagram showing an entire system including a metaverse performance platform according to one embodiment of the present disclosure.

FIG. 1 is an exemplary functional block diagram showing an entire system including a metaverse performance platform according to one embodiment of the present disclosure.

A metaverse performance platform 100 includes a payment management unit 110, a subscriber management unit 120, a user group management unit 130, a performance channel management unit 140, a virtual channel management unit 150, a static performance information transmission unit 160, a performance control information generation unit 170, a real-time performance information transmission unit 180, and a bidirectional interaction providing device 190.

In FIG. 1, the payment management unit 110, the subscriber management unit 120, the user group management unit 130, the performance channel management unit 140, the virtual channel management unit 150, the static performance information transmission unit 160, the performance control information generation unit 170, the real-time performance information transmission unit 180 are illustrated as separate components from the bidirectional interaction providing device 190, but the present disclosure is not limited thereto.

According to an embodiment of the present disclosure, some of the payment management unit 110, the subscriber management unit 120, the user group management unit 130, the performance channel management unit 140, the virtual channel management unit 150, the static performance information transmission unit 160, the performance control information generation unit 170, and the real-time performance information transmission unit 180 may be included in the bidirectional interaction providing device 190.

The payment management unit 110 interfaces with an external payment system to charge users for payment of expenses such as performance service fees, fees for providing necessary props and premium contents in the performance, and various payment systems or various payment methods may be applied.

The subscriber management unit 120 manages user information of users subscribing to access the metaverse performance platform 100.

The user group management unit 130 divides users into groups and manages them.

The user group management unit 130 is a function provided to users (i.e., audiences) and manages a user group using a specific performance service, a user group arbitrarily selected by users, and a user group designated by a performance planner or performer.

The user group management unit 130 stores and manages identifiers for the respective user groups, and identification information of users included in each user group.

The user group management unit 130 may designate at least one user group within a specific performance channel, and the corresponding user group may be subdivided into subgroups according to accessed physical channels.

The performance channel management unit 140 is a function of managing a channel for a performance in which a user can participate in the metaverse performance platform 100. Since a large number of users cannot simultaneously access a single physical channel due to technical limitations, a performance channel in which a large number of users participate is set as a virtual channel, and several physical channels are integrated to be set as one virtual channel.

In this case, the physical channel is responsible for concurrent user access and performance-related data transmission, and users participating in each physical channel are managed by the user group management unit 130.

The virtual channel management unit 150 transmits performance-related data to users participating in the physical channel.

The virtual channel management unit 150 creates a static performance information transmission session, a real-time performance information transmission session, and an interaction transmission session for each performance channel.

The static performance information transmission unit 160 transmits static performance information to a user terminal 30 connected to the corresponding performance channel using the static performance information transmission session. The static performance information is information such as a virtual performance hall, stage equipment, stage special effects, and a virtual avatar 3D model required for performance which are transmitted to the static performance information transmission unit 160 by a performance planner device 10 in advance. The static performance information transmission unit 160 may transmit static performance information to the user terminal 30 before a real-time performance.

Meanwhile, the user terminal 30 may be a user device such as a head mount display (HMD), but is not limited thereto, and various devices such as a smartphone may be used.

The performance control information generation unit 170 receives information related to a real-time performance from the performance planner device 10 and provides real-time performance control information to the real-time performance information transmission unit 180.

The real-time performance information transmission unit 180 transmits real-time performance information to the user terminal 30 using a real-time performance information transmission session. The real-time performance information includes variation data such as movement of an avatar, movement of a performance hall, changes in stage equipment and special effects, and performance sound information. The real-time performance information is transmitted to the user terminal 30 in real time, and the user terminal 30 synchronizes and outputs the transmitted real-time performance information as performance content.

The bidirectional interaction providing device 190 transfers interaction information (i.e., interaction feedback) generated from the user terminal 30 connected to the corresponding performance channel from other user terminals and a performer device 20 using the interaction transmission session.

The interaction information is interaction data such as messages, voices, avatar movements, emoticons, and the like that can be transmitted between users and a performer, users and users, user groups and user groups, or user groups and the performer. According to the present embodiment, unlike the conventional metaverse platform, the bidirectional interaction providing device 190 allows users participating in virtual channels to send and receive interaction information regardless of the physical channel classification to which the users are accessing.

When transmitting interaction information in a user group, the bidirectional interaction providing device 190 additionally provides a function of generating synchronization information to synchronize interaction feedback for simultaneous output to users in a same group when outputting the interaction feedback to the user group or integrating and mixing feedbacks from the users in the corresponding group into one, and one of the synchronization and the mixing is selected and used as needed.

Figure 2:
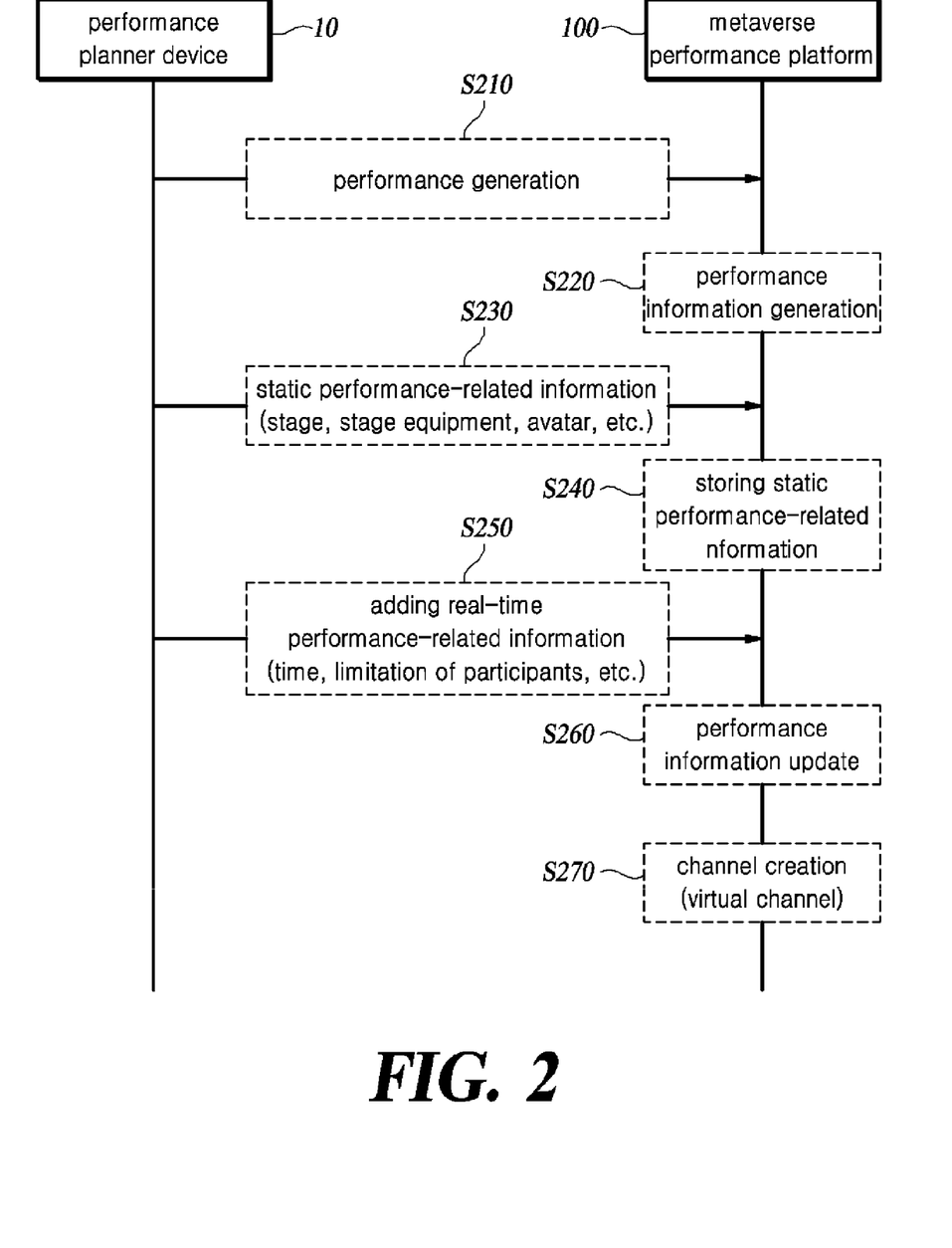
FIG. 2 is a flowchart illustrating a process that may be preceded before providing real-time performance service in the metaverse performance platform.

FIG. 2 is a flowchart illustrating a process that may be preceded before providing the real-time performance service in the metaverse performance platform.

Hereinafter, a preceding process before providing the real-time performance service will be described with reference to FIGS. 1 and 2 together.

The performance planner device 10 transmits performance-related information to the static performance information transmission unit 160 (S210).

The metaverse performance platform 100 receives the performance-related information and generates performance information (S220).

The performance planner device 10 transmits static performance-related information (stage, stage equipment, avatar, etc.) necessary to service the corresponding performance to the metaverse performance platform 100 (S230).

The metaverse performance platform 100 stores the static performance-related information in a storage associated with the performance information (S240).

When the performance planner device 10 additionally stores real-time performance-related information (performance start time, performance end time, limit on the number of participants, etc.) required for real-time performance service prior to the real-time performance service (S250), the metaverse performance platform 100 updates the performance information using the real-time performance-related information (S260).

The metaverse performance platform 100 creates a virtual channel for a real-time performance, allocates a channel for the corresponding real-time performance to the virtual channel, and maps virtual channel information (S270). The user terminal 30 subscribes to the metaverse performance platform 100 in advance and the metaverse performance platform 100 stores subscriber information.

Figure 3:
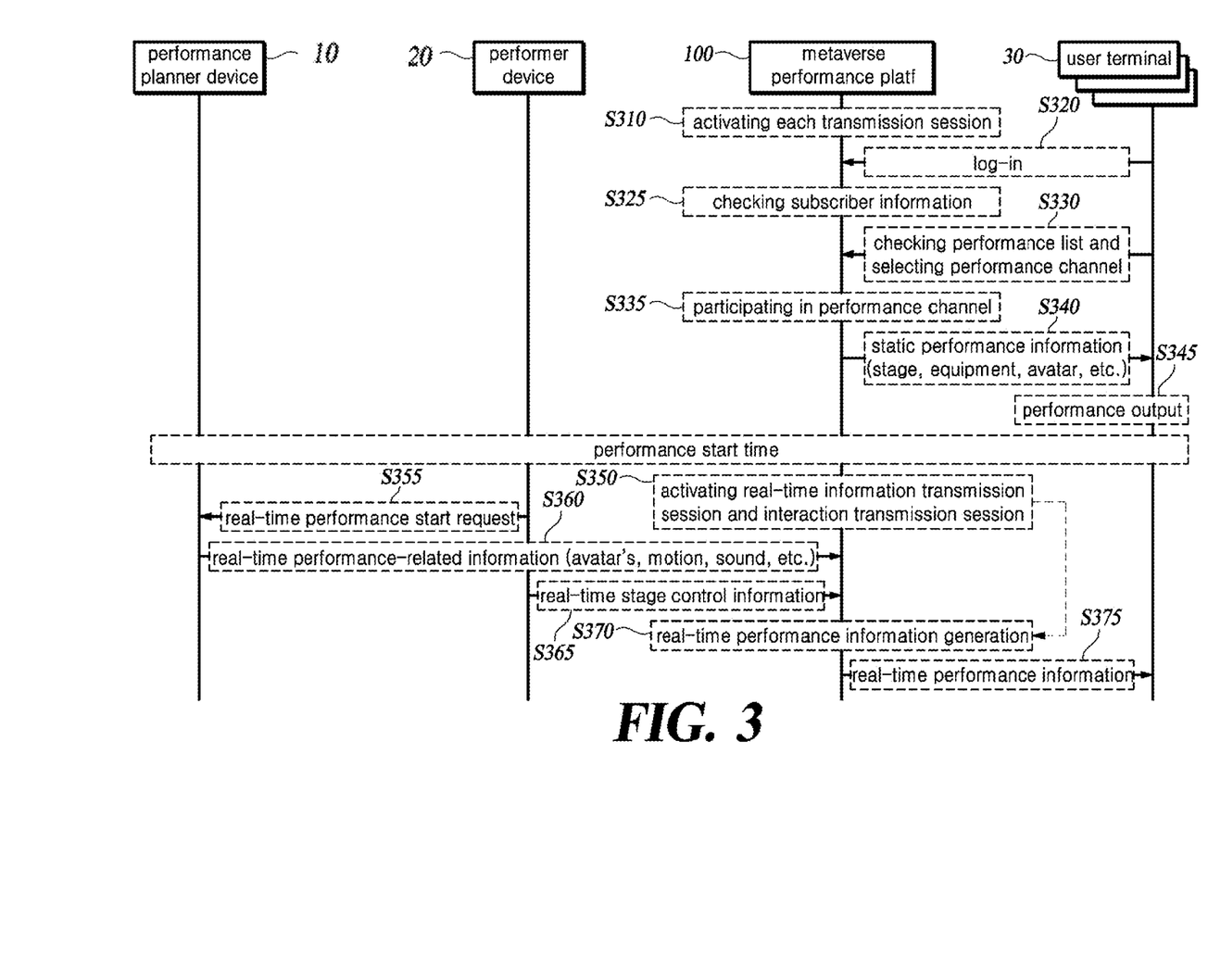
FIG. 3 is a flowchart illustrating a real-time performance service providing process.

FIG. 3 is a flowchart illustrating a real-time performance service providing process.

The performance planner device 10 starts a process of providing real-time performance service by transmitting a performance standby request to the metaverse performance platform 100 a certain time before the start of the performance.

The metaverse performance platform 100 activates a channel of the corresponding performance and activates a static performance information transmission session in the channel (S310).

A user (i.e., audience) of the user terminal 30 logs in to the metaverse performance platform 100 (S320).

The metaverse performance platform 100 confirm whether the logged-in user is a subscribed user by checking subscriber information (S325).

The user terminal 30 checks a performance list provided by the metaverse performance platform 100 and selects an available performance channel in the provided performance list (S330).

The metaverse performance platform 100 allows the logged-in user terminal 30 to participate in the corresponding performance channel (S335).

The static performance information transmission unit 160 transmits a visualization program and static performance information required before a performance to the user terminal 30 through a static performance information transmission session connection until the start of a real-time performance (S340).

The user terminal 30 receives static performance information, displays an image on a screen, and outputs sound (S345).

When it is time for the performance to start, the metaverse performance platform 100 activates each transmission session, such as the real-time information transmission session, the interaction transmission session, etc. (S350).

The performance planner device 10 requests the performer device 20 to start a real-time performance (S355).

The performer device 20 starts a performance according to the supervision of the performance planner device 10 (S355).

The performer device 20 transmits information necessary for the real-time performance, such as performance sound and motion information of a performer's avatar, to the real-time performance information transmission unit 180 (S360).

The performance planner device 10 transmits real-time stage equipment control information synchronized with a performer's performance to the real-time performance information transmission unit 180 (S365). The real-time stage equipment control information may be transmitted asynchronously as needed, or information for synchronization with information on the performer's performance may be added to the real-time stage equipment control information and transmitted.

The real-time performance information transmission unit 180 receives real-time performance-related information from the performer device 20 and the performance planner device 10, generates performance information by checking whether the entire performance scenario is properly synchronized and correcting it (S370), and transmits it to the user terminals 30 participating in the performance channel (S375).

After receiving the real-time performance information, the user terminal 30 visualizes the performance based on the received real-time performance information.

As described above, the user devices in the performance channel are the user terminals 30 participating in the virtual channel, and mean users who integrate a group of user terminals 30 accessing to the physical channel system. A user group may be designated as needed among the user terminals 30.

When selecting a user group, user terminals 30 included in a same physical channel system may be included in the same user group, and the user group may be configured through selective selection among all user terminals 30 in the virtual channel.

Figure 4:
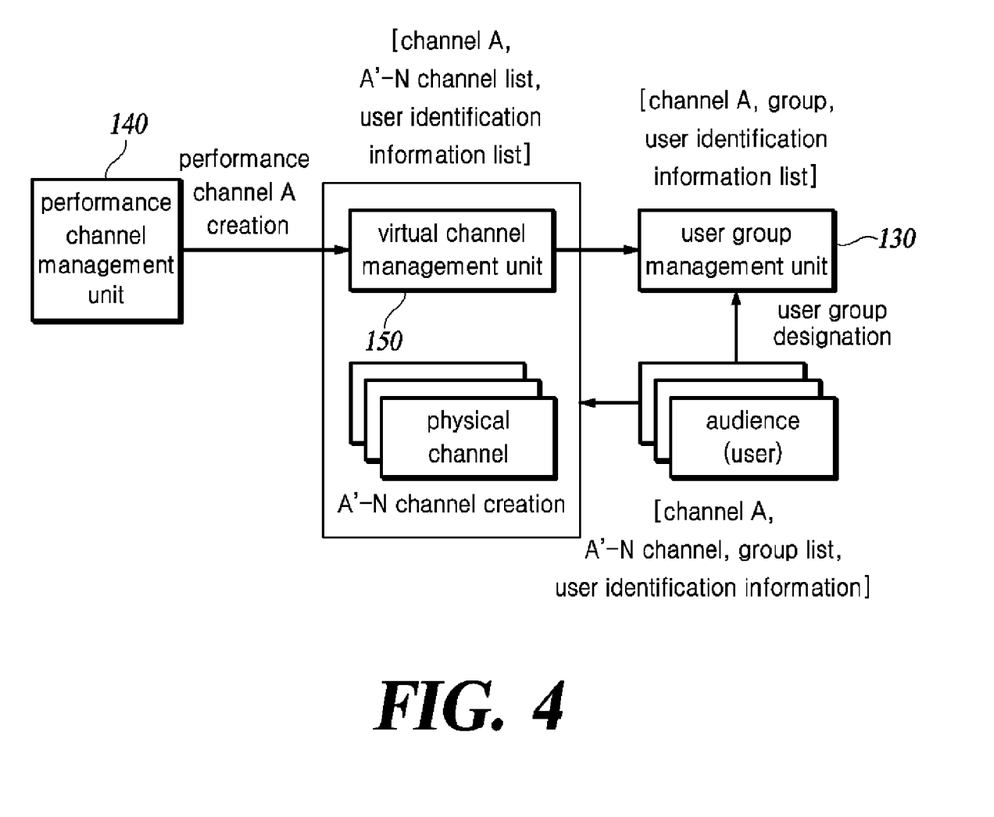
FIG. 4 is a diagram illustrating operations related to user group management.

FIG. 4 is a diagram illustrating operations related to user group management.

The performance channel management unit 140 generates information about the performance to be added to the performance channel management. Assuming that the generated performance is performance A, when the user terminals 30 (audiences) participate in the performance A channel, the user terminals 30 are allocated to physical channels and virtual channels corresponding to the performance A channel, and virtual channel information and physical channel information are assigned to each user identification information corresponding to each of the user terminals 30.

The user group management unit 130 sets the user terminals 30 allocated in the physical channel as a basic user group, and user group information based on the physical channel includes physical channel information, a group identifier, and a list of user identification information in the corresponding physical channel.

In addition, the user group management unit 130 allows the user terminal 30 to form a user group with other desired user devices in the same virtual channel. In this case, the user group information based on the virtual channel includes virtual channel information, a group identifier, and a list of user identification information n the channel.

When the user terminal 30 connects with each of the real-time performance information transmission session and the interaction transmission session, identification information including user identification information, virtual channel information, and user group information is used.

Figure 5:
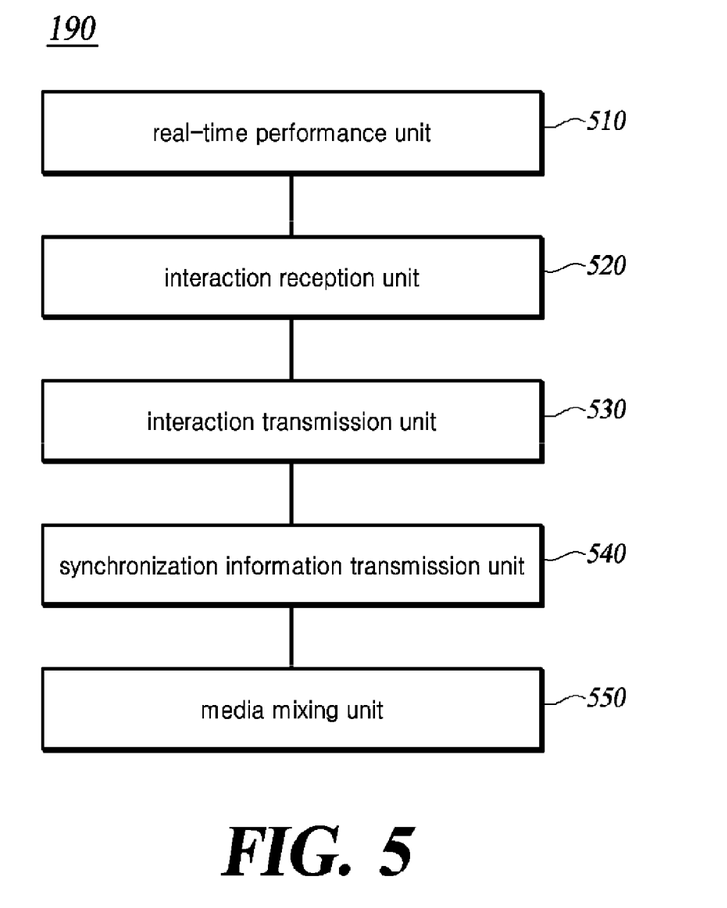
FIG. 5 is an exemplary functional block diagram illustrating a bidirectional interaction providing device according to one embodiment of the present disclosure.
Figure 6:
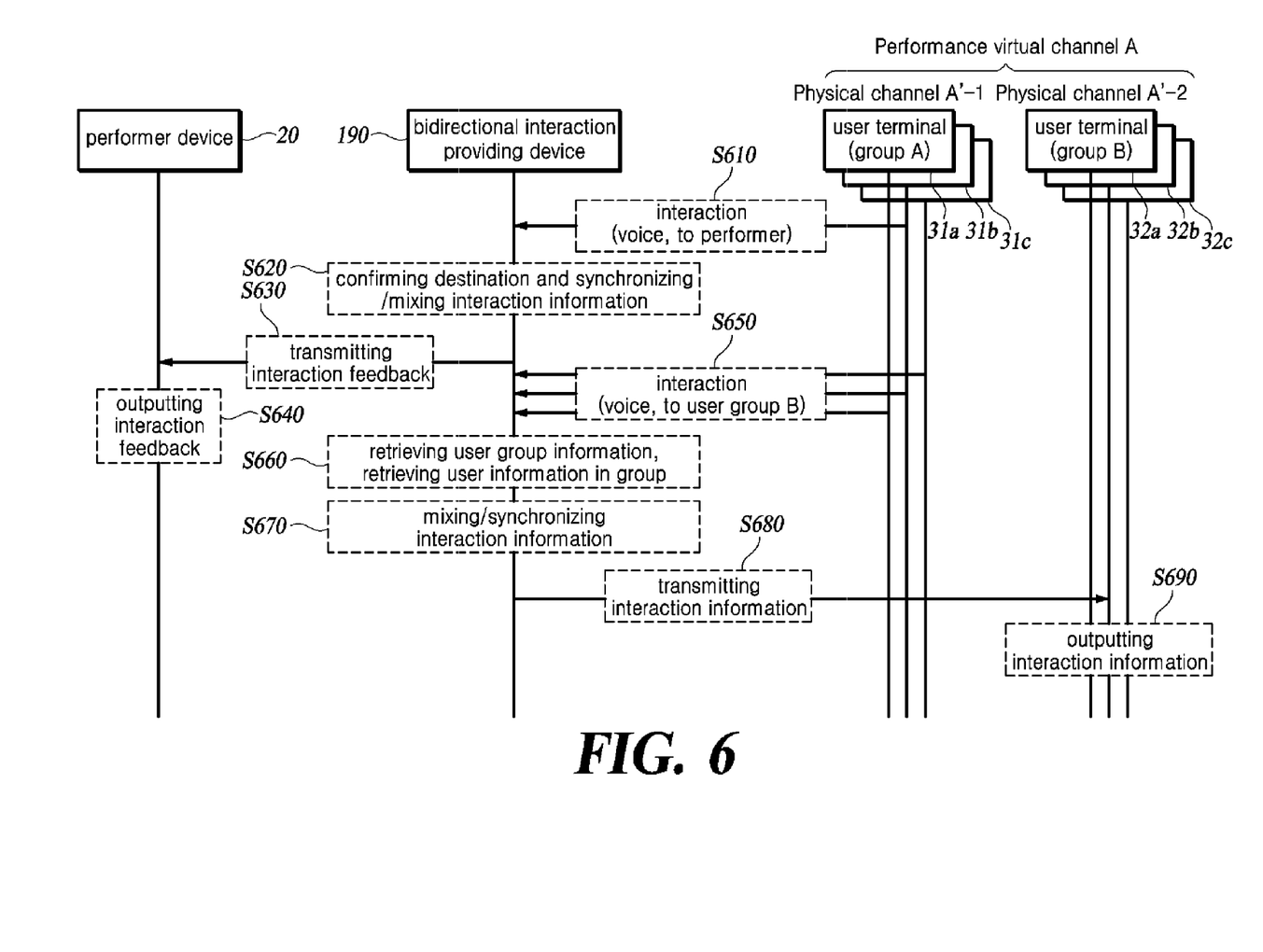
FIG. 6 is a diagram illustrating an interactive data transmission scenario in a real-time performance process.

FIG. 5 is an exemplary functional block diagram illustrating the bidirectional interaction providing device according to one embodiment of the present disclosure, and FIG. 6 is a diagram illustrating an interactive data transmission scenario in a real-time performance process.

Hereinafter, the bidirectional interaction providing device 190 according to the present embodiment will be described with reference to FIGS. 5 and 6 together.

The bidirectional interaction providing device 190 according to the present embodiment may include a real-time performance unit 510, an interaction reception unit 520, an interaction transmission unit 530, a synchronization information transmission unit 540, and a media mixing unit 550.

The real-time performance unit 510 transmits real-time performance information through the real-time performance information session to each user terminal 30 participating in a performance channel A related to a real-time performance. For reference, the function of the real-time performance unit 510 may be performed by the real-time performance information transmission unit 180.

The user terminals 30 participating in the performance channel A includes a first-a terminal 31*a*, a first-b terminal 31*b*, and a first-c terminal 31*c* of a first physical channel A'-1, and a second-a terminal 32*a*, a second-b terminal 32*b*, and a second-c terminal 32*c* of a second physical channel A'-2.

The interaction reception unit 520 receives interaction feedback from the first user terminal through the interaction transmission session (S610).

Information included in the interaction feedback includes information such as type of interaction, subject of interaction, target of interaction, selection of mixing/synchronization, and interaction data.

Information indicating the type of interaction may include information indicating that the type of interaction is voice, information indicating that the type of interaction is video, and the like. The information indicating that the type of interaction is voice means that interaction data is voice, and the information indicating that the type of interaction is video means that interaction data is video.

Information indicating the subject of interaction may be individual users, user groups, and the like.

When the subject of interaction is an individual user terminal (i.e., a user terminal that does not belong to a specific user group), synchronization or mixing of interaction data is not performed.

When the subject of interaction is a user terminal of a user group, interaction data is synchronized or mixed and transmitted to the target of interaction.

The target of interaction means a destination to which interaction data is transmitted.

When the subject of interaction is an individual user terminal, the target of interaction may be another user terminal within the same user group, a user terminal within another user group, the performer device 20, another user group, and the like. When the subject of interaction is an individual user, mixing or synchronization of interaction data is not performed.

When the subject of interaction is a user terminal included in a user group, the target of interaction may be one user terminal in another user group, another user group, or the performer device 20. When the subject of interaction is a user terminal belonging to a user group, mixing or synchronization of interaction data may be performed.

When the subject of interaction is a user terminal of user group A and the target of interaction is the performer, the interaction transmission unit 530 confirms that the destination information of the interaction feedback (i.e., the target of interaction) is the performer, synchronizes or mixes all of the interaction data included in the interaction feedback of each user terminal 30 included in the user group A (S620), and then transmits them to the performer device 20 as the destination (S630).

The performer device 20 receives the interaction data, and outputs a sound or displays an image (S640).

When the subject of interaction is a user terminal of the user group A, and the destination is another user group (e.g., user group B), the interaction transmission unit 530 may mix or synchronize the interaction data of each user terminal 31*a*, 31*b*, 31*c* corresponding to the user group A among the received interaction feedbacks, and transmit them to each user terminal 32*a*, 32*b*, 32*c* of the user group B.

In case that the subject of the interaction is a user terminal of the user group A and the destination is a user terminal of another user group (e.g., the second-b terminal 32*b* of the user group B), when the interaction reception unit 520 receives the interaction feedbacks transmitted from the user terminals 31*a*, 31*b*, and 31*c* of the user group A (S650), the interaction transmission unit 530 retrieves the stored user group information to identify the second-b terminal 32*b* of the user group B (S660).

The interaction transmission unit 530 mixes or synchronizes each interaction data of the user terminals 31*a*, 31*b*, and 31*c* (S670), and transmits the mixed or synchronized interaction data to the second-2 terminal 32*b* of the user group B (S680).

The second-b terminal 32*b* receives and outputs the mixed or synchronized interaction data (S690).

The interaction data of each user terminal 31*a*, 31*b*, 31*c* corresponding to the user group A may be mixed or synchronized to be transmitted to another user terminal 32*a* of another user group.

Meanwhile, user output option of each user terminal 30 for selecting whether to mix or synchronize the interaction data transmitted to the destination by each user terminal 30 included in the user group may be set by the corresponding user terminal 30. That is, the corresponding user terminal 30 may select whether to mix or synchronize the interaction feedback of each user terminal 30 belonging to a specific user group.

For example, when an individual user terminal (e.g., the first-a terminal 31*a*) belonging to the user group A wants to synchronize interaction data and send it to a destination, the individual user terminal sets mixing/synchronization selection information (i.e., user option information) to 0 and transmits it to the interaction reception unit 520. Meanwhile, when the individual user terminal (e.g., the first-a terminal 31*a*) belonging to the user group A wants to mix interaction data and send it to a destination, the individual user terminal sets the mixing/synchronization selection information to 1 and transmits it to the interaction reception unit 520.

The mixing/synchronization selection information may be transmitted together with the interaction data whenever an interaction feedback packet is transmitted, but the user terminal 30 may transmit the mixing/synchronization selection information to the interaction reception unit 520 before the interaction feedback packet is transmitted, and then mixing/synchronization selection information may be omitted from the interaction feedback packet. In this case, the interaction reception unit 520 receives mixing/synchronization selection information from each user terminal 30 and stores it as a user output option of the corresponding user terminal 30.

When the user terminal 30 wants to reset the mixing/synchronization selection information, the user terminal 30 retransmits the mixing/synchronization selection information to the interaction reception unit 520. In this case, the interaction reception unit 520 updates the mixing/synchronization selection information retransmitted by the corresponding user terminal 30 as a user output option of the corresponding user terminal 30.

When real-time performance information is transmitted to the user terminal 30, the synchronization information transmission unit 540 transmits synchronization information to the user terminal 30 along with real-time performance information. In this case, the synchronization information is timeline information and provides a temporal reference for synchronization, and the synchronization information may be transmitted periodically. When the user terminal 30 transmits interaction feedback according to the received synchronization information, the synchronization information may also be included in the interaction feedback received by the interaction reception unit 520.

When the user output option is selected as synchronization, the interaction transmission unit 530 synchronizes interaction data of each user terminal 30 belonging to the same user group according to the synchronization information included in the interaction feedback and transmits the synchronization data to the destination.

When the user output option is selected as mixing, the media mixing unit 550 mixes interaction data of each user terminal 30 belonging to the same user group and transmits it to the destination.

For example, if the interaction data is a 'heart above head' motion, it is possible to optimize the transmission data capacity by mixing N pieces of interaction data of user terminals 30 in the same user group into one screen and providing it to the performer device 20. The performer device 20 has the advantage of maximizing the interaction effect, as there are interactions (surfing, shouting/singing through voice mixing, etc.) that are possible only in the mixed expression rather than when the interaction data of the user terminals 30 in the same user group are received simultaneously.

Meanwhile, whether each user terminal 30 belongs to the same user group is determined by checking stored user group information and confirming user identification information for each user group.

Interaction feedback may also be generated from the performer device 20 and transmitted to a user group or individual users. The interaction feedback generated from the performer device 20 also includes information such as type of interaction, subject of interaction, target of interaction, and interaction data.

Also in the performer device 20, the destination information of the interaction feedback may be the user group B, the manager terminal of the user group A, the user terminal 32*a* of the user group B, and the like.

The interaction reception unit 520 receives interaction feedback generated from the performer device 20 and transmits interaction data (voice, video, etc.) to the destination.

The method of transmitting the interaction feedback of the performer device 20 to the destination is the same as the method of transmitting the interaction feedback of the individual user terminal 30 to the destination.

As shown in FIG. 6, according to the present embodiment, transmission of interactive data is possible even between users who are not assigned to the same physical channel.

The interaction transmission unit 530 may synchronize or mix the interaction feedback according to a group output option related to the interaction feedback.

In this case, the interaction reception unit 520 receives group option information of the user group including the user terminal 30 from the manager terminal of the corresponding user group before receiving the interaction feedback, and sets the group output options according to the group option information. herein, the group option information may be one of information indicating synchronization and information indicating mixing.

The interaction transmission unit 530 first checks whether the group output option is set, and transmits interaction feedback to the destination according to the group output option when the group output option is set and transmits the interaction feedback to the destination according to the user output option associated with the interaction feedback when the group output option is not set, When the group output option is set by the group option information sent by the manager terminal of the user group, the manager terminal of the user group may transmit group option information indicating that the group output option is released to the interaction reception unit 520. In this case, the interaction reception unit 520 stores information indicating that the group output option is not set.

The interaction transmission unit 530 may group interaction feedbacks having the same feedback form, destination, and user output option among the interaction feedbacks of the user terminals in the user group. That is, the interaction transmission unit 530 checks the form of feedback to determine whether the interaction data is, for example, voice or video. In this case, the interaction feedbacks of user terminals having the same feedback form and user output option may be synchronized or mixed and transmitted to a corresponding destination.

In addition, when information indicating that the manager terminal of a specific user group transmits group-based interaction feedback is transmitted as group option information to the interaction reception unit 520, the interaction reception unit 520 stores information indicating group-based interaction feedback according to the group option information sent by the manager terminal of the corresponding user group. In this case, when the manager terminal transmits the interaction feedback to the interaction reception unit 520, the interaction transmission unit 530 checks the group option information and confirms that the interaction feedback transmitted by the manager terminal is group-based interaction feedback.

The interaction transmission unit 530 copies the received interaction feedback as many as the number of user terminals in the corresponding user group, mixes the copied group-based interaction feedbacks, and transmits the mixed interaction feedbacks to the destination.

As described above, according to the present embodiment, a large-scale virtual performance in which a large number of users participates can be provided in real time on the metaverse, and interactions between users, interactions between users and the performer, and interactions between user groups that occur during the performance can be freely exchanged.

Figure 7:
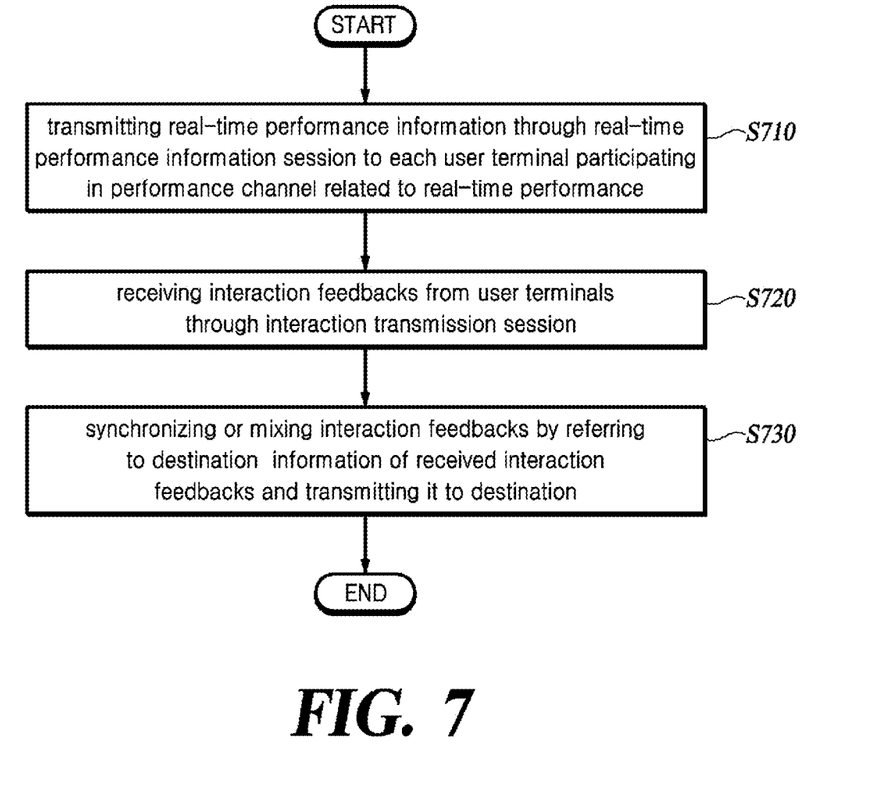
FIG. 7 is a flowchart illustrating a bidirectional interaction providing method according to one embodiment of the present disclosure.

FIG. 7 is a flowchart illustrating a bidirectional interaction providing method according to one embodiment of the present disclosure.

Hereinafter, the bidirectional interaction providing method according to the present embodiment will be described with reference to FIGS. 1 to 7 together.

The real-time performance unit 510 transmits real-time performance information through the real-time performance information session to each user terminal participating in a performance channel related to real-time performance (S710).

The interaction reception unit 520 receives interaction feedbacks from the user terminals 30 through the interaction transmission session (S720).

The interaction transmission unit 530 refers to the destination information of the received interaction feedbacks, synchronizes or mixes the interaction feedbacks, and transmits the synchronized or mixed interaction feedbacks to the destination (S730).

Meanwhile, various functions or methods described in the present disclosure may be implemented as instructions stored in a non-transitory storage medium that can be read and executed by one or more processors. The non-transitory storage medium includes, for example, all types of storage devices in which data is stored in a form readable by a computer system. For example, the non-transitory storage medium includes a storage medium such as an erasable programmable read only memory (EPROM), a flash drive, an optical drive, a magnetic hard drive, and a solid state drive (SSD).

What is claimed is:

1. A bidirectional interaction providing device comprising:
a real-time performance unit that transmits real-time performance information through a real-time performance information session to each user terminal participating in a performance channel related to the real-time performance;
an interaction reception unit that receives interaction feedback from a first user terminal through an interaction transmission session; and
an interaction transmission unit that transmits the interaction feedback to a destination of the interaction feedback by referring to information on the destination,
wherein the interaction transmission unit synchronizes or mixes the interaction feedback according to a group output option related to the interaction feedback, and
wherein the interaction reception unit receives group option information of a user group including the first user terminal from a manager terminal of the user group before receiving the interaction feedback, and sets the group output option according to the group option information, wherein the group option information is one of information indicating the synchronization and information indicating the mixing.

2. The bidirectional interaction providing device of claim 1, wherein the interaction transmission unit synchronizes or mixes the interaction feedback and transmit the synchronized or mixed interaction feedback to the destination.

3. The bidirectional interaction providing device of claim 2, further comprising a synchronization information transmission unit that transmits the synchronization information to each user terminal when the real-time performance information is transmitted.

4. The bidirectional interaction providing device of claim 3, wherein the interaction transmission unit synchronizes interaction feedback of the user group including the first user terminal using synchronization information received with the interaction feedback and transmits the interaction feedback to the destination.

5. The bidirectional interaction providing device of claim 1, wherein, when the group output option is not set, the interaction transmission unit synchronizes or mixes the interaction feedback according to a user output option related to the interaction feedback.

6. The bidirectional interaction providing device of claim 5, wherein the interaction reception unit receives user option information from the first user terminal and sets the user output option according to the user option information before receiving the interaction feedback, wherein the user output option represents one of information indicating the synchronization and information indicating the mixing.

7. The bidirectional interaction providing device of claim 1, wherein the interaction transmission unit transmits the interaction feedback to the destination with interaction feedback of another user terminal in the user group including the first user terminal.

8. The bidirectional interaction providing device of claim 7, wherein the interaction transmission unit groups interaction feedbacks having the same feedback form, destination, and user output option among interaction feedbacks of user terminals in the user group, and transmits the grouped interaction feedbacks to a corresponding destination.

9. The bidirectional interaction providing device of claim 1, wherein when the first user terminal is the manager terminal of the user group including the first user terminal and the interaction feedback is group-based interaction feedback, the interaction transmission unit copies the group-based interaction feedback as many as the number of user terminals in the user group and mixes the copied group-based interaction feedbacks to transmit the mixed group-based interaction feedbacks to the destination.

10. A bidirectional interaction providing method comprising:
a real-time performance step of transmitting real-time performance information through a real-time performance information session to each user terminal participating in a performance channel related to the real-time performance;
an interaction receiving step of receiving interaction feedback from a first user terminal through an interaction transmission session; and
an interaction transmission step of transmitting the interaction feedback to a destination of the interaction feedback by referring to information on the destination,
wherein in the interaction transmission step, the interaction feedback is synchronized or mixed according to a group output option related to the interaction feedback,
wherein the interaction receiving step includes receiving group option information of a user group including the first user terminal from a manager terminal of the user group and setting the group output option according to the group option information before receiving the interaction feedback, wherein the group option information is one of information indicating the synchronization and information indicating the mixing.

11. The bidirectional interaction providing method of claim 10, wherein in the interaction transmission step, the interaction feedback is synchronized or mixed to be transmitted to the destination.

12. The bidirectional interaction providing method of claim 11, further comprising a synchronization information transmission step that transmits the synchronization information to each user terminal when the real-time performance information is transmitted.

13. The bidirectional interaction providing method of claim 12, wherein the interaction transmission step includes synchronizing interaction feedback of the user group including the first user terminal using synchronization information received with the interaction feedback and transmitting the interaction feedback to the destination.

14. The bidirectional interaction providing method of claim 10, wherein in the interaction transmission step, the interaction feedback is synchronized or mixed according to a user output option related to the interaction feedback when the group output option is not set.

15. The bidirectional interaction providing method of claim 14, wherein the interaction receiving step includes receiving user option information from the first user terminal and setting the user output option according to the user option information before receiving the interaction feedback, wherein the user output option information represents one of information indicating the synchronization and information indicating the mixing.

16. The bidirectional interaction providing method of claim 10, wherein in the interaction transmission step, the interaction feedback is transmitted to the destination with interaction feedback of another user terminal in the user group including the first user terminal.

17. The bidirectional interaction providing method of claim 16, wherein the interaction transmission step includes grouping interaction feedbacks having the same feedback form, destination, and user output option among interaction feedbacks of user terminals in the user group, and transmitting the grouped interaction feedbacks to a corresponding destination.

18. The bidirectional interaction providing method of claim 10, wherein when the first user terminal is the manager terminal of the user group including the first user terminal and the interaction feedback is group-based interaction feedback, the interaction transmission step includes copying the group-based interaction feedback as many as the number of user terminals in the user group and mixing the copied group-based interaction feedbacks to transmit the mixed group-based interaction feedbacks to the destination.

* * * * *